US006875417B1

United States Patent
Shah et al.

(10) Patent No.: US 6,875,417 B1
(45) Date of Patent: Apr. 5, 2005

(54) CATALYTIC CONVERSION OF HYDROCARBONS TO HYDROGEN AND HIGH-VALUE CARBON

(75) Inventors: Naresh Shah, Lexington, KY (US); Devadas Panjala, Ponca City, OK (US); Gerald P. Huffman, Lexington, KY (US)

(73) Assignee: University of Kentucky Research Foundation, Lexington, KY (US)

(*) Notice: Subject to any disclaimer, the term of this patent is extended or adjusted under 35 U.S.C. 154(b) by 280 days.

(21) Appl. No.: 10/279,489

(22) Filed: Oct. 24, 2002

Related U.S. Application Data (60) Provisional application No. 60/336,427, filed on Oct. 24, 2001.

(51) Int. Cl.[7] ................................................. C01B 3/26
(52) U.S. Cl. ..................................... 423/650; 423/445 R
(58) Field of Search ............................. 423/650, 445 R (56) References Cited

U.S. PATENT DOCUMENTS

| | | |
|---|---|---|
| 5,427,762 A | 6/1995 | Steinberg et al. |
| 5,437,250 A | 8/1995 | Rabinovich et al. |
| 5,580,839 A | 12/1996 | Huffman et al. |
| 5,973,444 A | 10/1999 | Xu et al. |
| 6,086,654 A | 7/2000 | Mulvaney, III et al. |
| 6,129,901 A | 10/2000 | Moskovits et al. |
| 6,183,714 B1 | 2/2001 | Smalley et al. |
| 6,203,814 B1 | 3/2001 | Fisher et al. |

OTHER PUBLICATIONS

Panjala, D. et al. "Hydrogen Production by Non–Oxidative Catalytic Decomposition of Methane". Fuel Chemistry Division Preprints 2001. 46(1).

Primary Examiner—Stanley S. Silverman
Assistant Examiner—Maribel Medina
(74) Attorney, Agent, or Firm—King & Schickli, PLLC (57) ABSTRACT

The present invention provides novel catalysts for accomplishing catalytic decomposition of undiluted light hydrocarbons to a hydrogen product, and methods for preparing such catalysts. In one aspect, a method is provided for preparing a catalyst by admixing an aqueous solution of an iron salt, at least one additional catalyst metal salt, and a suitable oxide substrate support, and precipitating metal oxyhydroxides onto the substrate support. An incipient wetness method, comprising addition of aqueous solutions of metal salts to a dry oxide substrate support, extruding the resulting paste to pellet form, and calcining the pellets in air is also discloses. In yet another aspect, a process is provided for producing hydrogen from an undiluted light hydrocarbon reactant, comprising contacting the hydrocarbon reactant with a catalyst as described above in a reactor, and recovering a substantially carbon monoxide-free hydrogen product stream. In still yet another aspect, a process is provided for catalytic decomposition of an undiluted light hydrocarbon reactant to obtain hydrogen and a valuable multi-walled carbon nanotube coproduct.

26 Claims, 6 Drawing Sheets

CATALYTIC CONVERSION OF HYDROCARBONS TO HYDROGEN AND HIGH-VALUE CARBON

This application claims the benefit of U.S. Provisional Patent Application Ser. No. 60/336,427 filed Oct. 24, 2001.

This invention was made with Government support under Dept. of Energy grant DE-FC26-99FT40540. The Government may have certain rights in this invention.

TECHNICAL FIELD

The present invention relates in general to methods and compositions for production of hydrogen from undiluted hydrocarbons. In particular, the invention relates to a method for non-oxidative catalytic decomposition of undiluted light hydrocarbons into a substantially pure hydrogen stream and carbon, and to alumina-supported nanoscale binary metal catalysts for use therewith. The invention further relates to methods and catalysts for non-oxidative catalytic decomposition of undiluted light hydrocarbons into a substantially pure hydrogen stream and carbon, wherein the carbon is deposited as high value carbon such as carbon nanotubes.

BACKGROUND OF THE INVENTION

Demand for hydrogen is increasing significantly, and is expected to increase further due to EPA regulations requiring deep desulfurization of petroleum based fuels in refineries, as well as its potential use in fuel cells in automotive and power generation applications. Traditional methods for hydrogen production include reforming or partial oxidation of methane to produce synthesis gas, followed by the water-gas-shi ft reaction to convert CO to $CO_2$. Generally, still further purification is necessary because the hydrogen product (following water-gas-shift reaction) contains sufficient CO to poison the catalysts used in PEM electrochemical fuel cells. Thus, conventional means for hydrogen production require a multi-step, costly process.

Non-oxidative catalytic decomposition of hydrocarbons such as methane is a known alternate method of hydrogen production. However, it is known that solid carbon deposits produced during conventional methods of catalytic decomposition of gas phase methane may foul reactors, catalysts, and gas handling systems. Consequently, there is a need in the art for methods and catalysts for non-oxidative catalytic decomposition of hydrocarbons which result in a substantially pure hydrogen product without production of carbon deposits ("coke"), which shorten useful reactor and catalyst performance lifetimes. There is further a need in the art for such a method and catalysts for use therewith which allows one-step production of a pure hydrogen product.

SUMMARY OF THE INVENTION

The present invention provides novel catalysts for accomplishing catalytic decomposition of undiluted light hydrocarbons to a hydrogen product, and methods for preparing such catalysts. In one aspect, a method is provided for preparing a catalyst by admixing an aqueous solution of an iron salt, at least one additional catalyst metal salt, and a suitable oxide substrate support, and precipitating metal oxyhydroxides onto the substrate support. The additional catalyst metal salt may be selected from the group consisting of V, Cr, Mn, Co, Ni, Cu, Zn, Nb, Mo, Ru, Rh, Pd, Ag, Ta, W, Re, Os, Ir, Pt, Au, and any mixture thereof. Binary metal catalysts for separating hydrogen from an undiluted light hydrocarbon are also provided.

In yet another aspect, a process is provided for purifying hydrogen from an undiluted light hydrocarbon reactant, comprising contacting the hydrocarbon reactant with a catalyst as described above in a reactor, and recovering a substantially carbon monoxide-free hydrogen product stream. In still yet another aspect, a process is provided for catalytic decomposition of an undiluted light hydrocarbon reactant to obtain hydrogen and a valuable multi-walled carbon nanotube coproduct, comprising passing the hydrocarbon reactant through a catalyst-containing reactor, recovering a substantially carbon monoxide-free product stream comprising hydrogen and unreacted hydrocarbon reactant, and removing carbon in the form of multi-walled carbon nanotubes from the reactor.

Other benefits and advantages of the present invention will become apparent to those skilled in this art from the following description wherein there is shown and described a preferred embodiment of this invention, simply by way of illustration of the modes currently best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification illustrates several aspects of the present invention and, together with the description, serves to explain the principles of the invention. In the drawing.

DETAILED DESCRIPTION OF THE INVENTION

The present invention provides novel catalysts for accomplishing catalytic decomposition of undiluted light hydrocarbons to a hydrogen product, and methods for preparing such catalysts. Advantageously, the catalysts of the present invention allow production of a substantially pure hydrogen from an undiluted hydrocarbon feedstock in a single step, and at reduced temperatures in comparison with conventional technology. The catalysts of this invention allow catalytic decomposition of hydrocarbons to hydrogen, without the formation of carbon deposits which may foul reactors and catalysts, shortening useful life. Methods for single-step catalytic decomposition of light hydrocarbons using the catalysts of this invention are also provided, which surprisingly result in a substantially pure hydrogen product and a valuable coproduct in the form of carbon nanotubes.

In one aspect, the present invention provides a method for preparing a catalyst by the steps of forming a slurry comprising an aqueous solution of an iron salt, at least one additional catalyst metal salt, and a suitable oxide substrate support. Next, a base is added in sufficient amounts to precipitate metal oxyhydroxides onto the oxide substrate support. Typically, an aqueous solution of ammonia will be used. Other suitable bases include aqueous solutions of NaOH and KOH. Typically, the pH of the metal salt/oxide substrate support solution is brought up to between 10 to about 12. The additional catalyst metal salt may incorporate a metal selected from the group consisting of V, Cr, Mn, Co, Ni, Cu, Zn, Nb, Mo, Ru, Rh, Pd, Ag, Ta, W, Re, Os, Ir, Pt, Au, and any mixture thereof. Typically, the metal of the additional catalyst metal salt is selected from the group consisting of Mo, Ni, Pd, and any mixture thereof.

Iron salts suitable for the methods and compositions of the present invention include $Fe(NO_3)_3$, $FeCl_3$, $FeCl_2$, $Fe(OOCCH_3)_2$, and any mixture thereof. The salts of the additional metal catalysts may include $(NH_4)_6Mo_7O_{24}$, $Pd(NO_3)_2$, $PdCl_2$. $NiNO_3)_2$, $NiCl_2$, and any mixture thereof. Oxide substrate supports suitable for this invention include alumina, silica, titania, zirconia, aluminosilicates, and mixtures thereof, although typically alumina supports such as $\gamma$-alumina are employed.

Typically, the iron salt and additional catalyst metal salt are added to the slurry in a ratio of between from about 0.5 wt % and about 5 wt % with respect to the oxide substrate support. In one embodiment, the iron salt, additional catalyst metal salt, and oxide substrate support are added in relative ratios of about 0.5 wt % additional catalyst metal salt, 4.5 wt % iron salt, and 95 wt % oxide substrate support. Prior to use, the collected slurry may be washed, dewatered to a desirable paste consistency, extruded into pellet form using conventional technology, and dried by any suitable means, such as vacuum drying. Typically, the slurry will be washed until pH is 9 or less.

The catalyst of the present invention may also be produced using an incipient wetness method, comprising impregnating a dry alumina powder with a solution of metal salts to produce a paste of the desired consistency. It will be appreciated that a sufficient amount of metal salt solution must be used to form the paste of desired consistency (typically 30–40 grams of metal salt solution per 100 g of alumina). This wet mixture may be extruded into pellet form using conventional technology, and vacuum dried. Next, the dried pellets are calcined in air for at least 2 hours, at temperatures of from about 200 to about 500° C. Advantageously, the incipient wetness method eliminates the need for additional steps necessary in the coprecipitation method, for example washing and dewatering.

In another aspect, the present invention provides a catalyst for producing hydrogen from an undiluted light hydrocarbon, comprising a binary metal-ferrihydrite structure coprecipitated on an oxide substrate support. The binary metal-ferrihydrite structure may comprise iron and a secondary element M selected from a group of metals consisting of V, Cr, Mn, Co, Ni, Cu, Zn, Nb, Mo, Ru, Rh, Pd, Ag, Ta, W, Re, Os, Ir, Pt, Au and any mixture thereof. Typically, as noted above the iron and secondary element M are included in a ratio of between from about 0.5 wt % and about 5 wt % with respect to the oxide substrate support. In a presently preferred embodiment of the invention, the secondary element M may be selected from the group of metals consisting of Mo, Ni, Pd, and mixtures thereof. The oxide substrate support may be any of the materials as described above, and the catalyst as used may comprise about 0.5 wt % M, 4.5 wt % Fe, and 95 wt % support.

In yet another aspect, the present invention provides a process for producing hydrogen from an undiluted light hydrocarbon reactant, comprising contacting the hydrocarbon reactant with a catalyst as described above in a reactor of conventional design, and recovering a substantially carbon monoxide-free product stream comprising hydrogen and unreacted hydrocarbon reactant. The hydrocarbon reactant may be selected from any of the group of hydrocarbons having a carbon (C) number of 15 or less, such as for example methane or ethane. Typically, the hydrocarbon reactant will be passed through the reactor at a temperature of from about 400° C. to about 900° C. In a preferred embodiment, the hydrocarbon reactant is passed through said reactor at a temperature of from about 500° C. to about 800° C.

The catalysts of the present invention as described above may be used as-prepared, or may be prereduced by exposure to flowing hydrogen or flowing hydrocarbon reactant at a temperature of from about 500° C. to about 1000° C. for about 2 hours, typically from about 700° C. to about 800° C., prior to use for hydrogen production. Typically, the catalysts will be prereduced at a temperature of from about 700° C. to about 800° C.

In still yet another aspect of the present invention, a process is provided for catalytic decomposition of an undiluted light hydrocarbon reactant to obtain hydrogen and a valuable multi-walled carbon nanotube coproduct, comprising passing the hydrocarbon reactant through a conventional reactor containing the catalysts of the present invention, and recovering a substantially carbon monoxide-free product stream comprising hydrogen and unreacted hydrocarbon reactant. The hydrocarbon reactant may be selected from any of the group of hydrocarbons as described above, and at a temperature range of from about 650° C. to about 800° C. The carbon product recovered is substantially in the form of multi-walled carbon nanotubes, with some carbon fibers and flakes. The catalysts may be used as-prepared, or may be pretreated as described above.

As summarized above, the present invention relates to novel methods and catalysts for non-oxidative decomposition of hydrocarbons to a substantially pure hydrogen product. The methods of the present invention may be accomplished, and the catalysts synthesized, by various means which are illustrated in the examples below. These examples are intended to be illustrative only, as numerous modifications and variations will be apparent to those skilled in the art.

EXAMPLE 1

Supported binary catalysts were prepared by first adding an aqueous solution of catalyst metal salts ($Fe(NO_3)_3 \cdot 9H_2O$, $(NH_4)_6Mo_7O_{24} \cdot 4H_2O$, $Pd(NO_3)_2 \cdot xH_2O$, and $Ni(NO_3)_2 \cdot 6H_2O$) to a slurry of γ-alumina (150 $m^2$/gram) and then precipitating metal oxyhydroxide on the alumina by raising the pH of the slurry with ammonia to from about 10 to about 12. The metal (Mo, Pd, Ni and Fe) concentrations were varied from 0.5% to 5% by weight with respect to the alumina support. The slurry was washed with distilled water and dewatered, and the resulting paste was extruded and vacuum dried to form pellets. These pellets were not calcined and showed poor crushing strength. Catalyst pellets were sized to roughly 1.5 mm dia.×4 mm. long.

EXAMPLE 2

Supported binary catalysts are prepared by first adding an aqueous solution of catalyst metal salts, selected in accordance with the catalyst to be prepared from the group consisting of $Fe(NO_3)_3$, $FeCl_3$, $FeCl_2$, $Fe(OOCCH_3)_2$, $(NH_4)_6Mo_7O_{24}$, $Pd(NO_3)_2$, $PdCl_2$, $Ni(NO_3)_2$, and $NiCl_2$ to a dry γ-alumina powder. The metal (Mo, Pd, Ni and Fe) concentrations are varied from 0.5% to 5% by weight with respect to the alumina support. Approximately 30–40 ml of aqueous metal salt solution are required per 100 g alumina powder to achieve the desired consistency of the resulting paste. The paste is then extruded into pellets using conventional technology and vacuum dried. Catalyst pellets are sized to roughly 1.5 mm dia.×4 mm. long. Next, the paste is calcined in air at a temperature of from about 200 to about 500° C. (typically 500° C.) for a period of at least 2 hours (typically overnight).

EXAMPLE 3

All experiments were performed in a fixed bed plug flow 12.57 mm. o.d. quartz reactor of a design known in the art. Ten ml/min methane was passed over one gram of catalyst pellets, prepared as described in Example 1 and supported on a quartz wool plug. For operational safety, the runs were terminated whenever the system back-pressure exceeded 5 psig. It should be appreciated, however, that any suitable reactor may be utilized, and that the flow rate of reactant, pretreatment, and product will be guided by the reactor dimensions.

The entire reactor exit stream was passed through a gas sampling loop of an online gas chromatograph fitted with dual gas flow thermal conductivity detectors (TCD) before venting. TCD sensitivity for hydrogen, methane, carbon monoxide, carbon dioxide, and water was calibrated by analyzing detector response as a function of concentrations of gas mixtures. Initially, the GC analysis runs were made sufficiently long to make sure that higher hydrocarbons ($C_2H_2$, $C_2H_4$ and $C_2H_6$) would elute before the next injection. Upon determination that no higher hydrocarbons were present in detectable quantities in the end product stream, the run time was shortened to 10 minutes. Catalyst activity for non-oxidative catalytic decomposition of undiluted methane to produce pure hydrogen and carbon was investigated as a function of temperature (200–1200° C.) and time-on-stream at 700° C. As a positive control, conventional non-catalytic, thermal cracking of methane was measured by flowing undiluted methane over γ-alumina pellets under reaction conditions identical to the catalytic runs.

For use in hydrogen production by catalytic cracking of light hydrocarbons, the catalysts were subjected to the following pretreatments:
  a. No pretreatment (as-prepared).
  b. Pre-reduction: Catalysts were reduced in flowing hydrogen (50 ml/min) for two hours at 700° C. or 1000° C. After reduction treatment, the experimental set-up was flushed with an inert gas to purge out residual and physisorbed hydrogen from the system till GC showed no hydrogen peak (approximately 15 minutes purge time).

Pure Iron Catalysts

Figure 1:
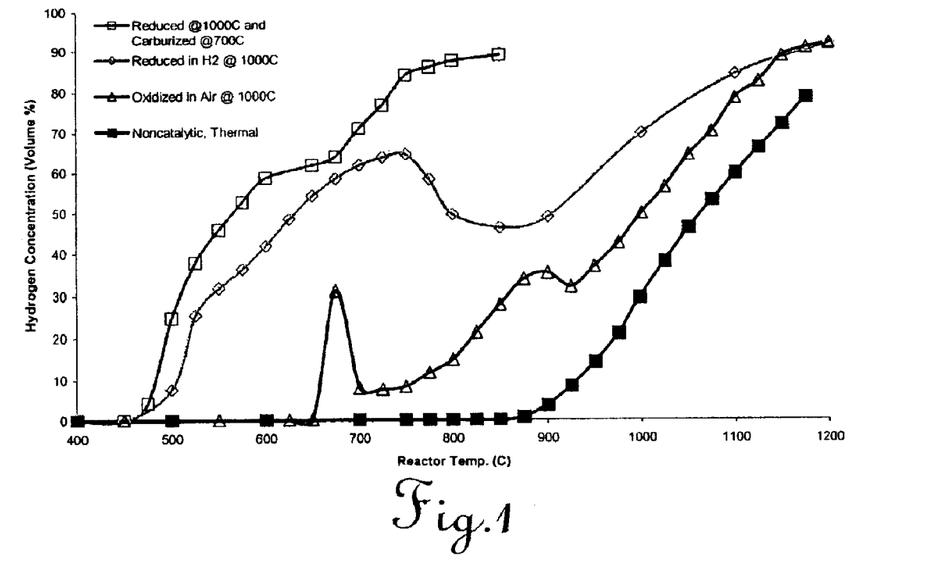
FIG. 1 shows the effect of various pretreatments on hydrogen production as a function of reactor temperature for methane decomposition over 5% $Fe/Al_2O_3$.

The activities of the 5% $Fe/Al_2O_3$ catalysts for the methane cracking reaction are shown in FIG. 1. The methane concentrations are complimentary to the hydrogen concentrations and approximately equal to 100-% $H_2$. The product gas stream did not contain any detectable amounts of $C_2$ and higher hydrocarbons. Hydrogen and methane were measured independently and the product stream always contained greater than 98% of these two gases. Except in the case of non-catalytic (thermal) cracking, there was a complete absence of any liquid products in all experiments.

The 5% $Fe/Al_2O_3$ catalyst required rather severe (1000° C.) temperature reduction to reduce the catalyst to a metallic state. A catalyst pre-reduced at lower temperatures (700° C. or 850° C.), was apparently not sufficiently reduced, as it was not as effective in methane decomposition at lower reactor temperatures.

Pure Molybdenum and Binary Molybdenum-Iron Catalysts

Figure 2:
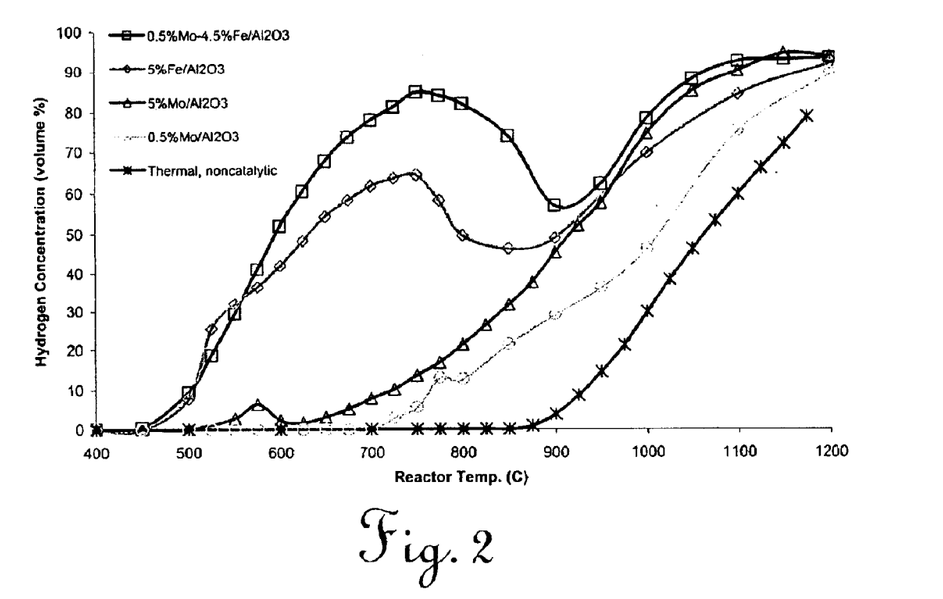
FIG. 2 compares hydrogen production using alumina-supported Mo-only and Fe-only catalysts with binary Mo—Fe catalysts prereduced at 1000° C.
Figure 3:
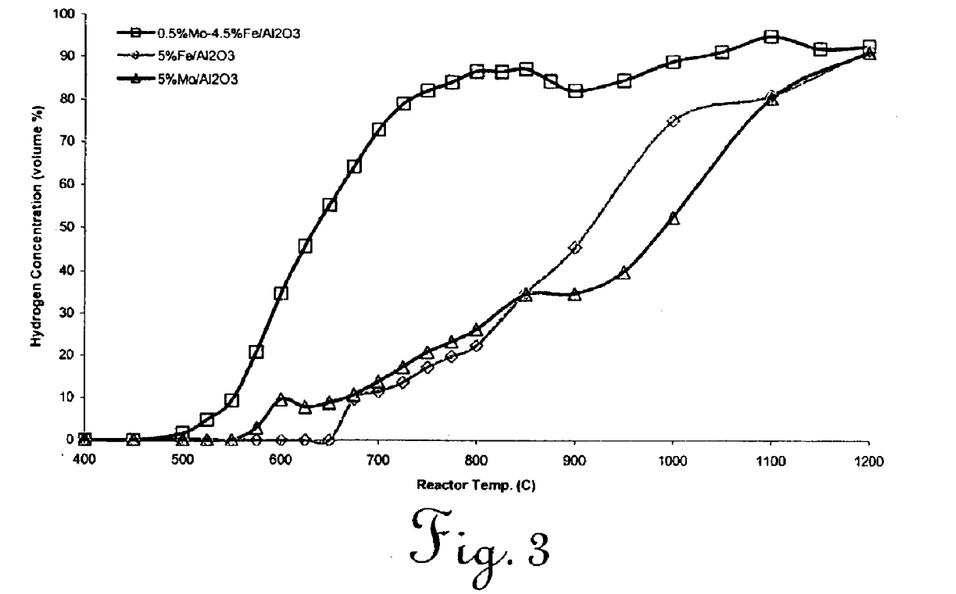
FIG. 3 compares hydrogen production using alumina-supported Mo-only and Fe-only catalysts with binary Fe—Mo catalysts prereduced at 700° C.
Figure 4:
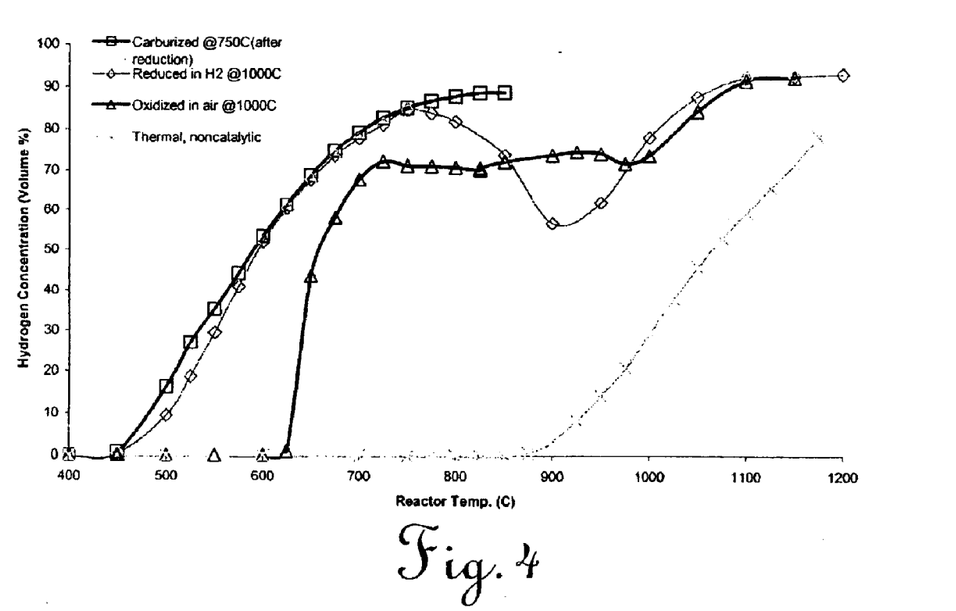
FIG. 4 shows the effect of various pretreatments on hydrogen production as a function of reactor temperature for methane decomposition over 0.5% Mo-4.5% $Fe/Al_2O_3$.

Hydrogen production using catalysts prepared as described in Example 1, comprising Mo-only, Fe-only, and Mo—Fe catalysts pre-reduced at 1000° C. is shown in FIG. 2. Pure Mo-only (both 5 and 0.5 wt. %) catalysts exhibited very little activity for methane decomposition, regardless of pre-treatment. However, the binary (0.5% Mo4.5% $Fe/Al_2O_3$) catalyst showed significantly better activity than Fe-only catalysts. This difference in activity between monometallic and binary metal catalyst was even more pronounced when the catalysts were pre-reduced at lower temperature (700° C.), as shown in FIG. 3. Pre-carburization of the catalyst showed minimal differences in hydrogen production when compared with only pre-reduced catalysts. FIG. 4 compares the activity of binary Fe—Mo catalysts with different pretreatments. Oxidized as well as as-prepared (no pre-treatment) catalysts showed good activity for methane decomposition.

Pure Palladium and Binary Palladium-Iron Catalysts

Figure 5:
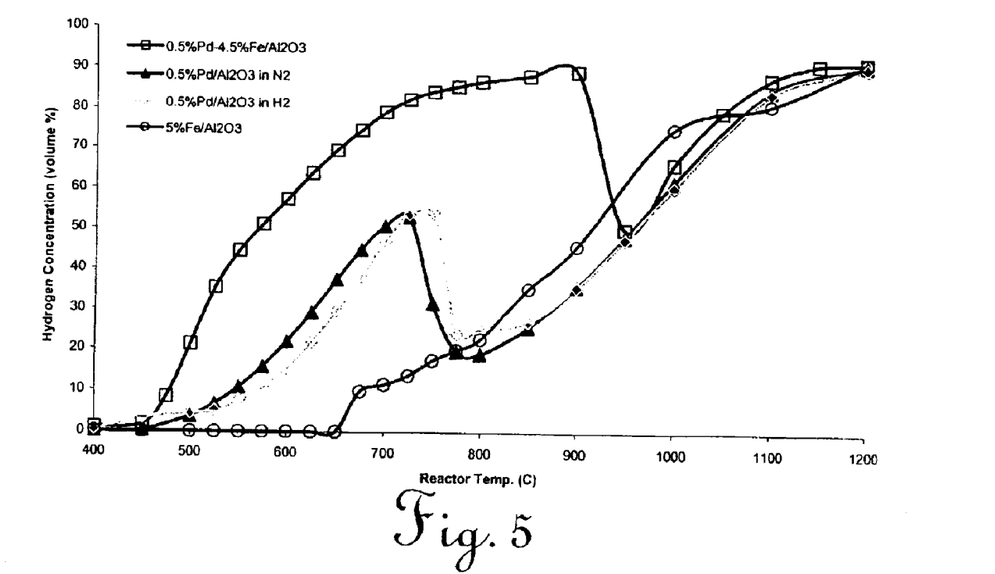
FIG. 5 compares hydrogen production using alumina-supported Pd-only and Fe-only catalysts with binary Pd—Fe catalysts prereduced at 700° C.

FIG. 5 compares hydrogen production from methane decomposition for Pd-only, Fe-only, and binary Pd—Fe catalysts pretreated at 700° C. The activity of binary Pd—Fe (0.5% Pd-4.5% $Fe/Al_2O_3$) was substantially enhanced over that of either the Fe-only or Pd-only catalyst. Pd-only and binary Pd—Fe catalysts did not require any special pretreatment for maximum activation.

Pure Nickel and Binary Nickel-Iron Catalysts

Figure 6:
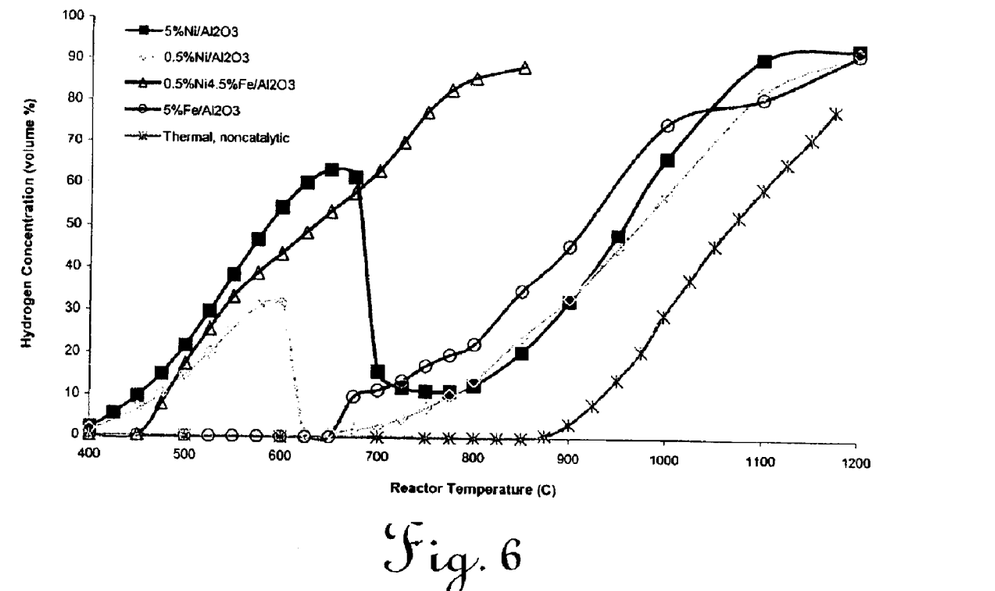
FIG. 6 compares hydrogen production using alumina-supported Ni-only and Fe-only catalysts with binary Ni—Fe catalysts prereduced at 700° C.

FIG. 6 compares hydrogen production from methane decomposition for Ni-only, Fe-only, and binary Ni—Fe catalysts pre-reduced at 700° C. A small addition of Ni not only considerably improved the activity of Fe (pre-reduced at 700° C.) catalyst, but also did not show the substantial reduction in activity exhibited by Ni-only catalysts.

Figure 7:
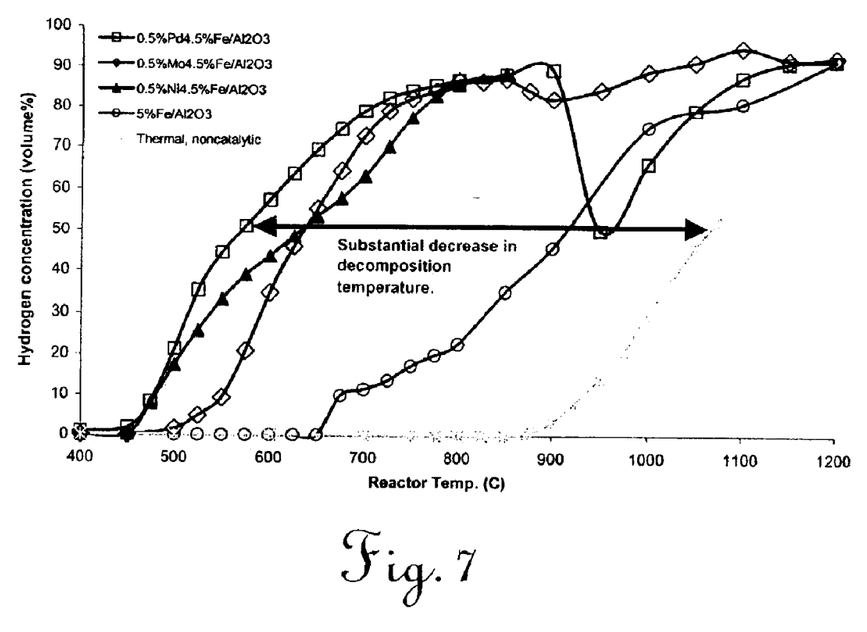
FIG. 7 compares hydrogen production using alumina-supported binary Pd—Fe, Mo—Fe, and Ni—Fe catalysts prereduced at 700° C.

FIG. 7 compares the observed $H_2$ concentrations as a function of increasing temperature for all of the different catalysts after a reduction pre-treatment at 700° C. The binary metal ($M-Fe/Al_2O_3$) catalysts lowered the methane decomposition temperatures by over 400° C. in comparison to thermal cracking of methane. In terms of activity, the Pd—Fe catalyst appeared to be the most effective, achieving an exit stream hydrogen concentration of approximately 80% at 700° C. The Mo—Fe and Ni—Fe binary catalysts were also quite active, yielding hydrogen concentrations of approximately 75% and 65% respectively at 700° C. At a reactor temperature of 800° C., hydrogen concentrations for all three catalysts rose to nearly 90%. Thus, the binary catalysts gave excellent hydrogen yields for catalytic methane decomposition at 700–800° C.

EXAMPLE 4

Thermal decomposition of methane is known to convert a gaseous methane inlet stream to a gaseous hydrogen outlet stream and solid carbon at high temperatures (1000–1200° C.). It is believed that methyl radicals polymerize to form cyclic and aromatic precursors to graphitic soot particles. In the non-catalytic thermal decomposition positive controls presented herein, it was found that a smooth, shiny, graphitic film covered the entire heated section of the reactor as well as the catalyst support and quartz wool. Exposure to a strong oxidizer (air as compared to $CO_2$ and steam) at temperatures greater than 700° C. was required to oxidize this tenacious film.

Methane was passed over the catalyst pellets of the present invention as described in Example 3, and the resulting carbon product was analyzed. Surprisingly, the carbon produced by catalytic decomposition of methane at the lower (~700–800° C.) temperatures of the methods and using the catalysts of the present invention was in the form of potentially valuable nanotubes. Scanning electron microscopy (SEM) revealed a profusion of carbon nanotubes produced during catalytic decomposition of methane using the binary Mo—Fe catalyst. A substantial amount (>90%) of the catalytically produced carbon deposits (at ~700–800° C.) were in the form of multi-walled carbon nanotubes. Carbon fibers were observed in small amounts (<5%) and only at higher reactor temperatures, where the catalysts were less active.

Figure 8:
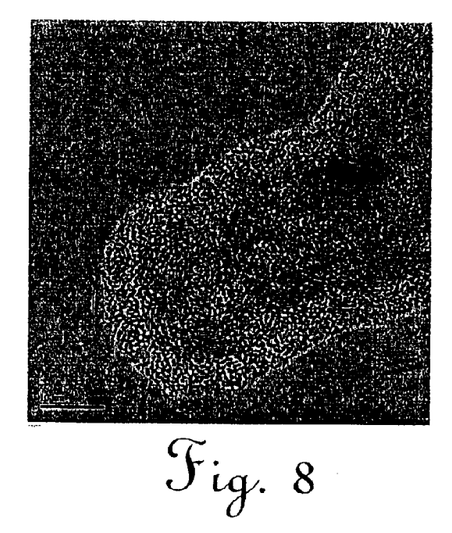
FIG. 8 is a HRTEM image of a multi-walled carbon nanotube grown by decomposing undiluted methane over as-prepared 0.5% Pd-4.5% $Fe/Al_2O_3$ at 600° C.

High-resolution transmission electron microscopy (HRTEM) established that nanotubes were multi-walled, with typically 10–15 graphene cylinders (spacing ~0.35 mm) encircling a hollow center region. As illustrated by FIG. 8, most of the nanotubes' ends for the binary M-Fe/$Al_2O_3$ did not contain catalyst particles. This supports the argument that the binary metallic catalyst particles are anchored at the support and the nanotubes continue to grow there, removing deposited carbon and preventing coating of the catalyst particles.

EXAMPLE 5

As discussed in Example 3, the binary catalysts of the present invention effectively shift the entire curve for hydrogen production towards substantially lower temperatures. Hydrogen (as well as the other reaction product, carbon) production reached a plateau in the 700–800° C. range. However, at temperatures somewhat above 800° C., most of the active catalysts showed decreased hydrogen production as reactor temperature increased. Normally, such decrease in activity is attributed to catalyst deactivation.

To better understand this unusual behavior, the carbon deposits formed in the isothermal reactions at the peak (~700° C.) and at the valley (~850° C.) of the hydrogen production versus reactor temperature curve were studied for the catalyst that exhibited the most severe dip in activity, 5% Ni/$Al_2O_3$. It was found that essentially all the carbon formed at the peak of this curve was in the form of multi-walled carbon nanotubes for all active catalysts. However, essentially no nanotubes were present at the temperature corresponding to the valley of the curves, where the carbon deposits were primarily either amorphous or graphitic fibers or flakes. Furthermore, this change in the form of carbon was reversible and contrary to fundamental thermodynamics; hydrogen production could be increased by decreasing temperature from the temperature corresponding to the valley of the curve.

Figure 9:
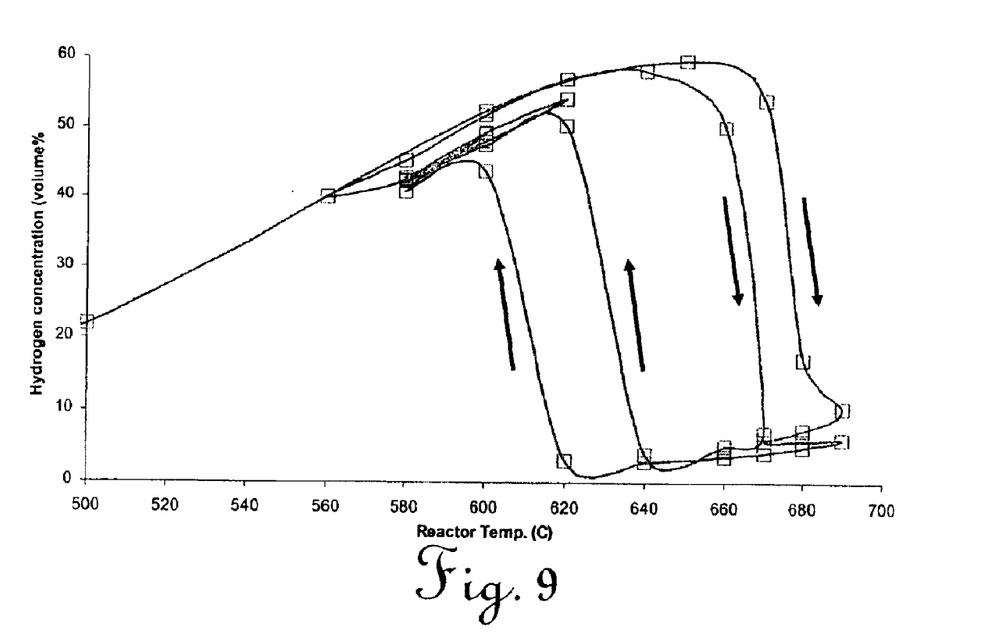
FIG. 9 shows hysteresistic behavior of 5% $Ni/Al_2O_3$ (prereduced at 700° C.) catalyst showing decreased hydrogen production with increased reactor temperature.

FIG. 9 shows the reversible effect of temperature on activity, with a decrease in hydrogen production with an increase in reactor temperature, followed by an increase in hydrogen production with a decrease in reactor temperature for the 700° C. pre-reduced 5% Ni/$Al_2O_3$ catalyst. Catalyst activity was fully restored by lowering temperature, and therefore this behavior is unlikely to be due to catalyst deactivation. While not wishing to be bound by any particular theory, it is believed that the binary catalysts of the present invention may stabilize the carbon reaction product in the form of nanotubes at the preferred operating temperatures, efficiently removing carbon from the catalyst surface and thereby driving the reaction forward for optimum hydrogen production. Increasing the reactor temperature above about 850° C. resulted in production of more amorphous and/or flake carbon, forms and concomitantly decreased hydrogen production.

EXAMPLE 6

Figure 10:
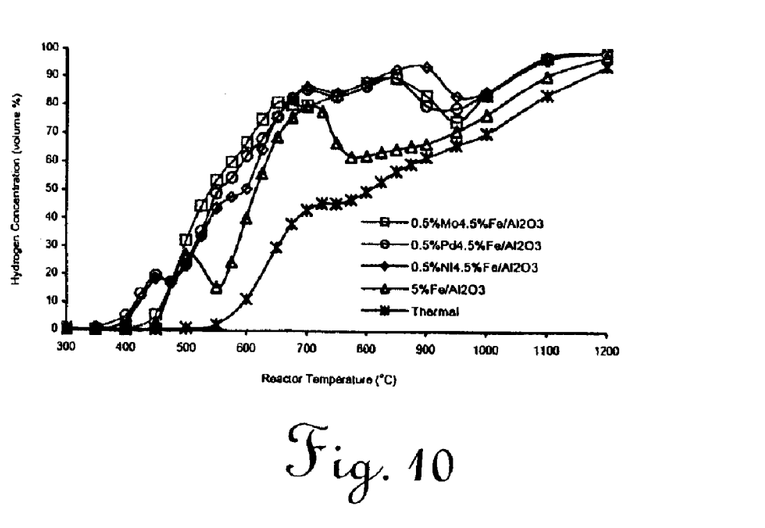
FIG. 10 compares hydrogen production by catalytic cracking of ethane using the catalysts of the present invention with non-catalytic (thermal) cracking.
Figure 11:
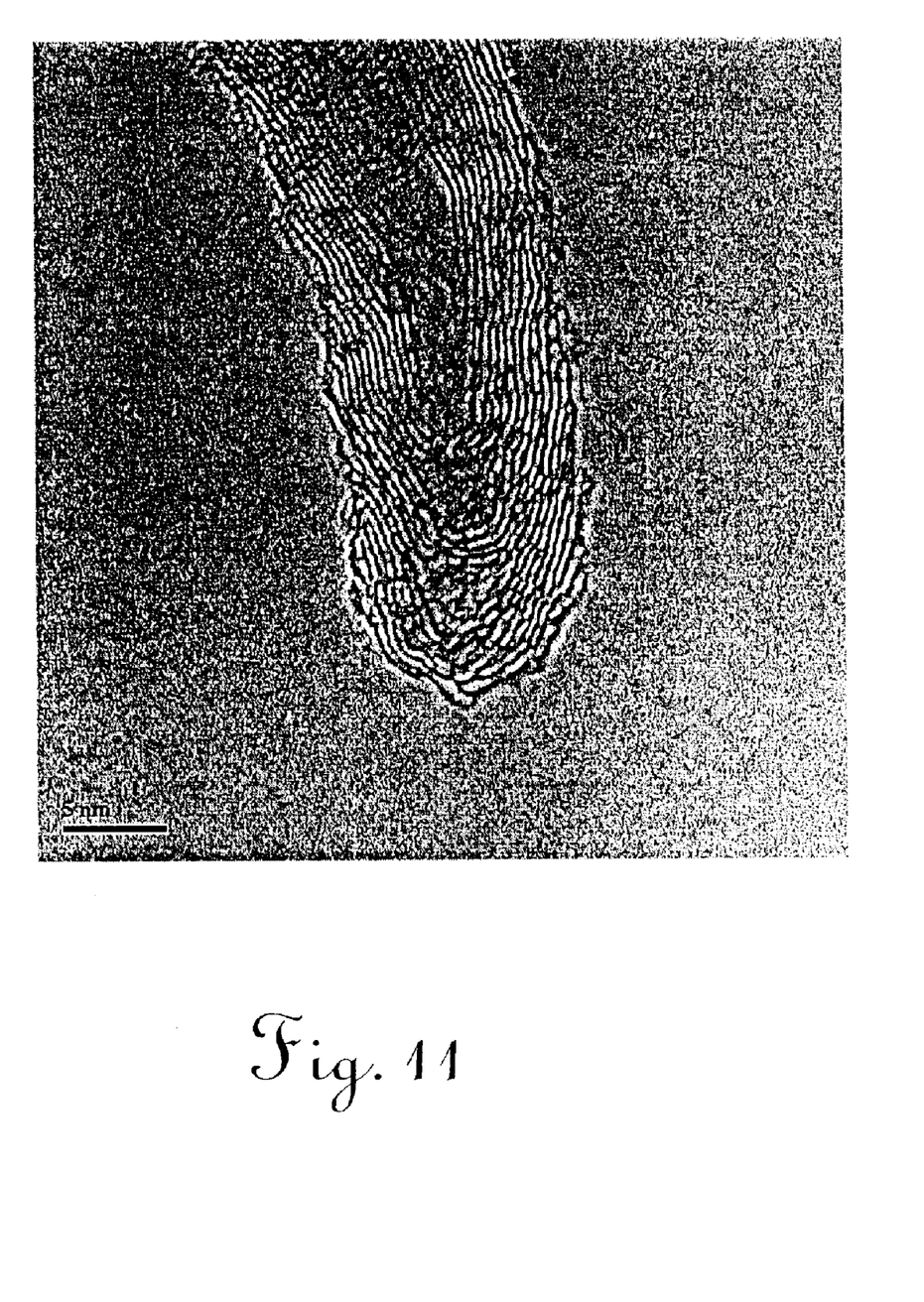
FIG. 11 is a HRTEM image of a multi-walled carbon nanotube grown by decomposing undiluted ethane at 500° C. over as-prepared 0.5% Mo-4.5% $Fe/Al_2O_3$ (prereduced at 700° C.).

The product distribution for thermal and catalytic cracking of ethane was evaluated using catalysts prepared as described in Example 1, and under the conditions substantially as described in Example 3. The catalysts were pre-reduced prior to use for hydrogen production as described in Example 3. As shown in FIG. 10, the catalysts of the present invention significantly reduced the temperature needed for high hydrogen production compared to thermal cracking. Further, thermal cracking resulted in a product stream containing significant ethylene, compared to almost non-existent quantities of ethylene resulting from use of the catalysts of the present invention. At 650° C., no appreciable decay in catalyst activity was observed for reaction times of up to 4 hours. As described in Example 4, at 650° C. the form of carbon observed as a coproduct of catalytic decomposition of ethane was multi-walled carbon nanotubes arranged as concentric hollow cylinders. In contrast, as shown in FIG. 11, at 500° C., the multiwalled carbon nanotubes were arranged as nested cones stacked over one another.

The foregoing description of preferred embodiments of the invention has been presented for purposes of illustration and description. It is not intended to be exhaustive or to limit the invention to the precise form disclosed. Obvious modifications or variations are possible in light of the above teachings. The embodiments were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. A process for production of hydrogen from a light hydrocarbon reactant, comprising:

in a reactor, adding a catalyst comprising binary metal-ferrihydrite structure coprecipitated on an oxide substrate support, said binary metal-ferrihydrite structure comprising iron and a secondary element M selected from the group of metals consisting of V, Cr, Mn, Co, Ni, Cu, Zn, Nb, Mo, Ru, Rb, Pd, Ag, Ta, W, Re, Os, Ir, Pt, Au and any mixture thereof, wherein said iron and said secondary element M are included in a ratio of from between about 0.5 wt % and about 5 wt % with respect to said oxide substrate support;

passing said hydrocarbon reactant over said catalyst bed at a suitable temperature; and recovering a substantially carbon monoxide-free product stream comprising hydrogen and unreacted hydrocarbon reactant.

2. The process set forth in claim 1, wherein said secondary element M is selected from the group of metals consisting of Mo, Ni, Pd, and any mixtures thereof.

3. The process set forth in claim 1, wherein said catalyst comprises about 0.5 wt % M, 4.5 wt % Fe, and 95 wt % support.

4. The process set forth in claim 1, wherein said oxide substrate support is selected from the group consisting of alumina, silica, titania, zirconia, aluminosilicates, and any mixture thereof.

5. The process set forth in claim 4, wherein said support is γ-alumina.

6. The process set forth in claim 1, wherein said light hydrocarbon is selected from the group of hydrocarbons having a carbon (C) number of 15 or less.

7. The process set forth in claim 1, wherein said light hydrocarbon is methane.

8. The process set forth in claim 1, wherein said light hydrocarbon is ethane.

9. The process set forth in claim 1, wherein said hydrocarbon reactant is passed through said reactor at a temperature of from about 400° C. to about 900° C.

10. The process set forth in claim 1, wherein said hydrocarbon reactant is passed through said reactor at a temperature of from about 500° C. to about 800° C.

11. The process set forth in claim 1, wherein said catalyst is prereduced prior to use in hydrogen production by exposure to flowing hydrogen at a temperature of from about 500° C. to about 1000° C. for about 2 hours.

12. The process set forth in claim 11, wherein said catalyst is prereduced prior to use in hydrogen production by exposure to flowing hydrogen at a temperature of from about 700° C. to about 800° C. for about 2 hours.

13. The process set forth in claim 1, wherein prior to use in hydrogen production said catalyst is exposed to flowing hydrocarbon reactant at a temperature of from about 500° C. to about 1000° C. for about 2 hours.

14. The process set forth in claim 13, wherein prior to use in hydrogen production said catalyst is exposed to flowing hydrocarbon reactant at a temperature of from about 700° C. to about 800° C. for about 2 hours.

15. A process for catalytic decomposition of a light hydrocarbon reactant to obtain hydrogen and a multi-walled carbon nanotube coproduct, comprising:

in a reactor, adding a catalyst comprising binary metal-ferrihydrite structure coprecipitated on an oxide substrate support, said binary metal-ferrihydrite structure comprising iron and a secondary element M selected from the group of metals consisting of V, Cr, Mn, Co, Ni, Cu, Zn, Nb, Mo, Ru, Rh, Pd, Ag, Ta, W, Re, Os, Ir, Pt, Au and any mixture thereof, wherein said iron and said secondary element M are included in a ratio of from between about 0.5 wt % and about 5 wt % with respect to said oxide substrate support;

passing said hydrocarbon reactant over said catalyst bed at a temperature of from about 650° C. to about 800° C.;

recovering a substantially carbon monoxide-free product stream comprising hydrogen and unreacted hydrocarbon reactant; and recovering said carbon nanotubes.

16. The process set forth in claim 15, wherein said secondary element M is selected from the group of metals consisting of Mo, Ni, Pd, and any mixtures thereof.

17. The process set forth in claim 15, wherein said catalyst comprises about 0.5 wt % M, 4.5 wt % Fe, and 95 wt % support.

18. The process set forth in claim 15, wherein said oxide substrate support is selected from the group consisting of alumina, silica, titania, zirconia, aluminosilicates, and any mixture thereof.

19. The process set forth in claim 18, wherein said support is γ-alumina.

20. The process set forth in claim 15, wherein said light hydrocarbon is selected from the group of hydrocarbons having a carbon (C) number of 15 or less.

21. The process set forth in claim 15, wherein said light hydrocarbon is methane.

22. The process set forth in claim 15, wherein said light hydrocarbon is ethane.

23. The process set forth in claim 15, wherein said catalyst is prereduced prior to use in hydrogen production by exposure to flowing hydrogen at a temperature of from about 700° C. to about 1000° C. for about 2 hours.

24. The process set forth in claim 23, wherein said catalyst is prereduced prior to use in hydrogen production by exposure to flowing hydrogen at a temperature of from about 700° C. to about 800° C. for about 2 hours.

25. The process set forth in claim 15, wherein prior to use in hydrogen production said catalyst is exposed to flowing hydrocarbon reactant at a temperature of from about 700° C. to about 1000° C. for about 2 hours.

26. The process set forth in claim 25, wherein prior to use in hydrogen production said catalyst is exposed to flowing hydrocarbon reactant at a temperature of from about 700° C. to about 800° C. for about 2 hours.

* * * * *